(12) United States Patent
Suzuki et al.

(10) Patent No.: US 8,919,946 B2
(45) Date of Patent: Dec. 30, 2014

(54) IMAGE FORMING APPARATUS AND RECORDING LIQUID

(75) Inventors: Ryota Suzuki, Tokyo (JP); Yuuma Usui, Kanagawa (JP); Takeo Tsukamoto, Kanagawa (JP); Hideomi Sakuma, Kanagawa (JP); Aino Hasegawa, Kanagawa (JP); Manabu Seo, Kanagawa (JP); Takeshi Orito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 256 days.

(21) Appl. No.: 13/697,731

(22) PCT Filed: May 2, 2011

(86) PCT No.: PCT/JP2011/060896
§ 371 (c)(1),
(2), (4) Date: Nov. 13, 2012

(87) PCT Pub. No.: WO2011/142404
PCT Pub. Date: Nov. 17, 2011

(65) Prior Publication Data
US 2013/0057628 A1 Mar. 7, 2013

(30) Foreign Application Priority Data
May 12, 2010 (JP) ................................. 2010-110483

(51) Int. Cl.
C09D 11/00 (2014.01)
B41M 5/00 (2006.01)
B41J 2/005 (2006.01)
C09D 11/328 (2014.01)
C09D 11/40 (2014.01)

(52) U.S. Cl.
CPC ............ *B41M 5/0023* (2013.01); *B41J 2/0057* (2013.01); *C09D 11/328* (2013.01); *C09D 11/40* (2013.01)
USPC ....................................................... 347/100

(58) Field of Classification Search
CPC .. B41J 2/0057; B41M 5/0023; C09D 11/328; C09D 11/40

USPC ......................................................... 347/100
See application file for complete search history.

(56) References Cited

U.S. PATENT DOCUMENTS

2002/0043177 A1   4/2002   Koitabashi et al.
2004/0252172 A1   12/2004  Hiraoka et al.
(Continued)

FOREIGN PATENT DOCUMENTS

EP   1167473 A1   1/2002
JP   55-065269    5/1980
(Continued)

OTHER PUBLICATIONS

International Search Report Issued Jun. 21, 2011 in PCT/JP2011/060896 Filed on May 2, 2011.

(Continued)

*Primary Examiner* — Laura Martin
(74) *Attorney, Agent, or Firm* — Oblon, Spivak, McClelland, Maier & Neustadt, L.L.P.

(57) ABSTRACT

An image forming apparatus with a voltage applying unit between a recording head and an intermediate transfer drum is capable of activating polyvalent metal ions inactivated in advance in jetted recording liquid without liquid activators independent of the recording liquid for sufficient flocculation on the drum. When the jetted recording liquid temporarily bridges the head and the drum, electrolysis of the recording liquid by the voltage applied instantly leads to generation of hydrogen ions on the drum, which triggers a sequence of reactions in the recording liquid of activation of polyvalent metal ions, cross-link between the activated polyvalent metal ions and anionic polymer, and increase in viscosity on the drum.

13 Claims, 5 Drawing Sheets

(56) References Cited

U.S. PATENT DOCUMENTS

| | | | |
|---|---|---|---|
| 2005/0054751 A1* | 3/2005 | Namba et al. | 523/160 |
| 2011/0273523 A1* | 11/2011 | Tsukamoto et al. | 347/103 |
| 2012/0050393 A1* | 3/2012 | Usui et al. | 347/22 |

FOREIGN PATENT DOCUMENTS

| | | |
|---|---|---|
| JP | 2002-088288 | 3/2002 |
| JP | 2002-283716 | 10/2002 |
| JP | 2003-128964 | 5/2003 |
| JP | 2003-246135 | 9/2003 |
| JP | 2005-001259 | 1/2005 |
| JP | 2006-321876 | 11/2006 |
| JP | 2009-248472 | 10/2009 |
| JP | 2010-173201 | 8/2010 |
| JP | 2010-208147 | 9/2010 |
| JP | 2010-247381 | 11/2010 |
| WO | 2010/095319 A1 | 8/2010 |

OTHER PUBLICATIONS

"Chelating Agent a NTA Nitrilo Triacetic Acid," http://www.chelest.co.jp/products/chelete-products/-nta-2.php, Total 6 Pages, (Sep. 27, 2012) (with English translation).

"Algimate Sodium," http://www.kimica.jp/products/NaAlgin/, Total 7 Pages, (Sep. 27, 2012) (with partial English translation).

U.S. Appl. No. 13/588,748, filed Aug. 17, 2012, Usui, et al.

\* cited by examiner

IMAGE FORMING APPARATUS AND RECORDING LIQUID

TECHNICAL FIELD

The present invention relates to an image forming apparatus for forming images by an inkjet method, and more particularly to an image forming apparatus and a recording liquid using a method of jetting, from a recording head, the recording liquid whose thickening properties are inactivated by adjusting the pH, and activating the thickening properties of the recording liquid by changing the pH of the recording liquid after the recording liquid has been jetted from the recording head.

BACKGROUND ART

When color images are printed onto recording sheets by an inkjet method, "bleeding" tends to occur at a color interface where two colors are overlapping.

In order to mitigate bleeding, a surface-active agent may be added to the ink to enhance the permeability of ink into paper sheets (see, for example, patent document 1).

By enhancing the permeability of ink into paper sheets, the bleeding at color interfaces can be mitigated; however, "feathering" tends to occur. Specifically, the ink permeates along the cellulose fiber forming the recording sheet, and therefore feathering occurs around the printed characters and fine lines.

In order to prevent both bleeding and feathering, there is a method of using ink having low permeability only for printing black characters. However, the black ink has poor drying properties, and therefore it is difficult to attain high-speed printing with this method.

Patent document 2 proposes a method for mitigating bleeding in images. Specifically, ink including a complex compound including polyvalent metal ions is pH-adjusted so that the polyvalent metal ions are essentially inactivated. Then, on a recording medium, the ink that has been pH-adjusted is mixed with a liquid having pH for activating the polyvalent metal ions. Accordingly, the color materials in the ink become flocculated so that bleeding is mitigated.

Patent document 3 discloses an inkjet recording method as follows. The ink includes polyvalent metal ions that can flocculate anionic resin. The polyvalent metal ions are included as an inactivated metal complex. This ink is discharged onto a coated paper sheet having an ink absorbing layer. After the ink is discharged, the polyvalent metal ions are discharged onto the ink absorbing layer from the metal complex by a means for changing the pH of the ink. According to functions of the discharged polyvalent metal ions, the pigment deposited on the ink absorbing layer is fixed.

According to the methods described in patent document 2 and 3, the thickening properties of the discharged ink can be controlled, and therefore bleeding and feathering in images can be appropriately mitigated. These effects can be achieved without hampering high-speed printing, which would otherwise be caused due to lack of drying properties.

However, with the above methods, it is necessary to prepare a liquid having pH suitable for activating the polyvalent metal ions, in addition to preparing the ink. This requires additional elements provided in the device as well as complex jetting control operations (which lead to reduced reliability).

In patent document 2, the polyvalent metal ions are inactivated with low-molecular anionic compounds. Therefore, the ink may not be sufficiently flocculated for achieving high quality images.

One approach is to provide the recording target material with pH suitable for activating the polyvalent metal ions; however, the recording target material would be limited to special paper, which degrades the freedom in selecting the sheet type by the user.

Patent Document 1: Japanese Laid-Open Patent Application No. S55-65269

Patent Document 2: Japanese Laid-Open Patent Application No. 2005-1259

Patent Document 3: Japanese Laid-Open Patent Application No. 2009-248472

Non-patent Document 1: http://www.chelest.co.jp/products/chelete-products/-nta-2.php Non-patent Document 2: http://www.kimica.jp/products/NaAlgin/

DISCLOSURE OF INVENTION

The present invention has been made in view of the above-described problems, and it is an object of at least one embodiment of the present invention to provide an image forming apparatus with which pH adjustment can be performed on a recording liquid that has been discharged without using an adjustment means (adjustment liquid) other than the recording liquid and without using special paper, which is capable of forming high quality images with high reliability, and which allows the user to have the freedom in selecting the sheet type.

An aspect of the present invention provides an image forming apparatus including a recording head that jets a recording liquid for forming an image; an intermediate transfer body that carries the image formed by the recording liquid, the intermediate transfer body facing the recording head; a voltage applying unit that applies a voltage between the recording head and the intermediate transfer body; and a transfer unit that transfers the image onto a recording target material, wherein the recording liquid includes water, a coloring agent, a wetting agent, a water-soluble metal complex including polyvalent metal ions, and an anionic polymer whose viscosity increases by being cross-linked with the polyvalent metal ions, wherein the recording liquid is adjusted to have a pH value by which the polyvalent metal ions are inactivated.

An aspect of the present invention provides a recording liquid that is jetted from a recording head to form an image, the recording liquid including water, a coloring agent, a wetting agent, a water-soluble metal complex including polyvalent metal ions, and an anionic polymer whose viscosity increases by being cross-linked with the polyvalent metal ions, wherein the recording liquid is adjusted to have a pH value by which the polyvalent metal ions are inactivated.

BRIEF DESCRIPTION OF DRAWINGS

FIGS. 2A through 2C indicate a mechanism of forming an ink image on an intermediate transfer body, where

BEST MODE FOR CARRYING OUT THE INVENTION

Embodiments of the present invention are described below with reference to the accompanying drawings.

Figure 1:
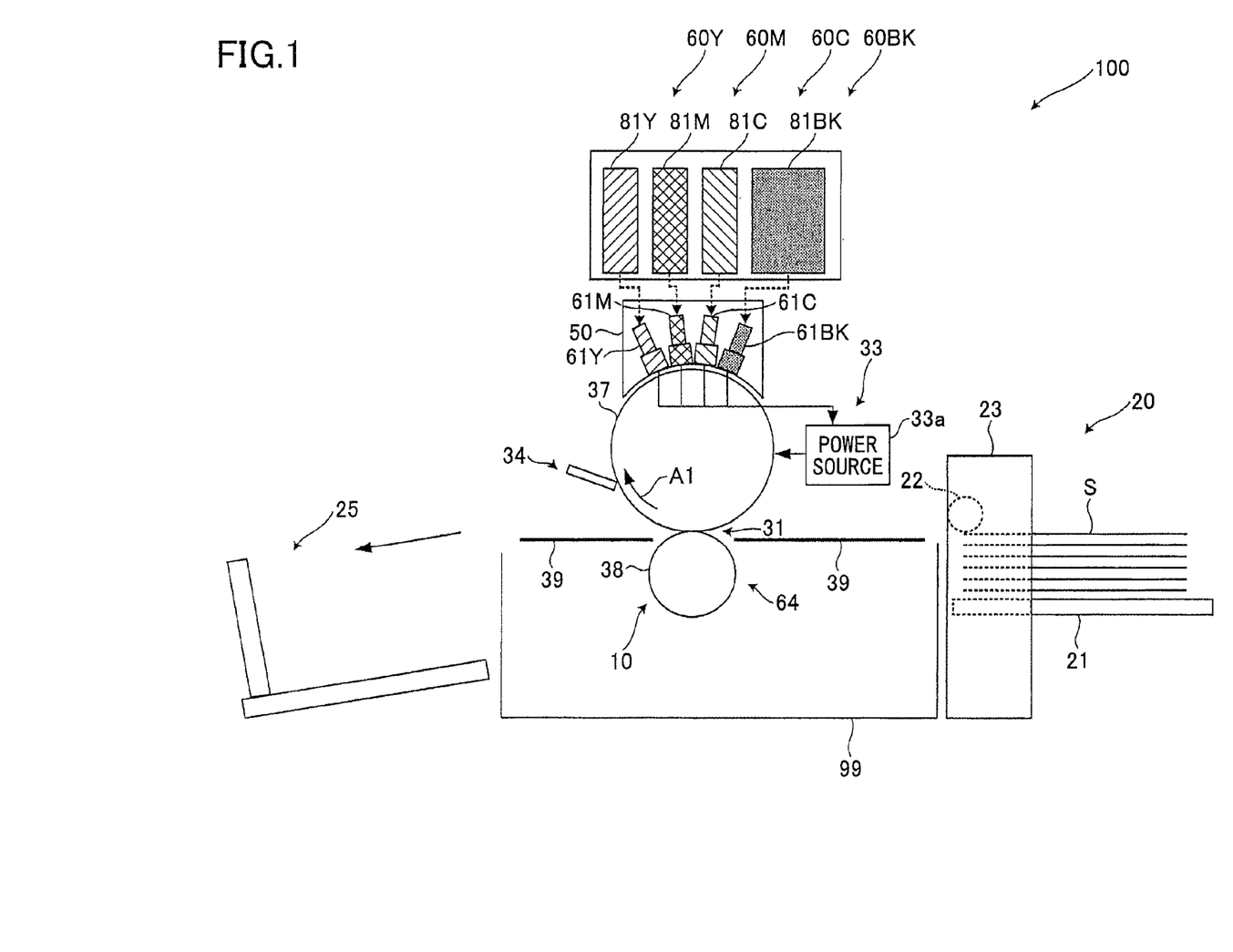
FIG. 1 is a schematic diagram of an image forming apparatus according to an embodiment of the present invention.

FIG. 1 is for describing an image forming apparatus (inkjet printer) according to an embodiment of the present invention. An image forming apparatus 100 includes recording heads (hereinafter, also simply referred to as "heads") 61Y, 61M, 61C, and 61BK for forming respective images of yellow, magenta, cyan, and black, which are the colors into which the image information is separated. These heads are recording liquid jetting bodies or ink heads for jetting conductive ink as recording liquid corresponding to the above colors.

The heads 61Y, 61M, 61C, and 61BK are disposed at positions facing the outer peripheral surface of an intermediate transfer drum 37 acting as an intermediate transfer body disposed substantially at the center of a main body 99 of the image forming apparatus 100. The heads 61Y, 61M, 61C, and 61BK are arranged in this order, from an upstream side of a direction in which the intermediate transfer drum 37 rotates, which is a clockwise direction indicated by an arrow A1 in FIG. 1. In FIG. 1, the letters Y, M, C, and BK accompanying the reference numerals indicate the corresponding colors of the respective elements.

The heads 61Y, 61M, 61C, and 61BK are respectively provided in ink jetting devices 60Y, 60M, 60C, and 60BK that are recording liquid jetting devices for respectively forming images of yellow, magenta, cyan, and black. In the ink jetting devices 60Y, 60M, 60C, and 60BK, the heads 61Y, 61M, 61C, and 61BK are arranged such that their longitudinal sides are extending in a perpendicular direction with respect to the paper sheet in FIG. 1.

While the intermediate transfer drum 37 is rotating in the A1 direction, yellow, magenta, cyan, and black recording ink are sequentially jetted from the heads 61Y, 61M, 61C, and 61BK so as to be sequentially superposed on the intermediate transfer drum 37 in an area facing the heads 61Y, 61M, 61C, and 61BK. Accordingly, a full-color image is formed on the surface of the intermediate transfer drum 37. As described above, the image forming apparatus 100 has a tandem structure, in which the heads 61Y, 61M, 61C, and 61BK are aligned in the A1 direction so as to face the intermediate transfer drum 37.

The recording liquid is jetted to (applied onto) the intermediate transfer drum 37 from the heads 61Y, 61M, 61C, and 61BK at different timings from the upstream side to the downstream side in the A1 direction, in such a manner that the image areas of the respective colors of yellow, magenta, cyan, and black are superposed on the same position on the intermediate transfer drum 37.

The image forming apparatus 100 includes the ink jetting devices 60Y, 60M, 60C, and 60BK respectively provided with the heads 61Y, 61M, 61C, and 61BK. Furthermore, the image forming apparatus 100 includes a conveying unit 10 acting as a sheet conveying unit which includes the intermediate transfer drum 37 and which conveys a transfer sheet S acting as a recording medium (recording target material) as the intermediate transfer drum 37 rotates in the A1 direction. Furthermore, the image forming apparatus 100 includes a sheet feeding unit 20 which can accommodate multiple stacked transfer sheets S and which feeds only the topmost transfer sheet S on the stacked transfer sheets S to the conveying unit 10. Furthermore, the image forming apparatus 100 includes a sheet discharge tray 25 which can accommodate multiple stacked transfer sheets S on which images have been formed (printed), that are conveyed by the conveying unit 10.

Furthermore, the image forming apparatus 100 includes a voltage applying unit 33 having the following feature. As shown in FIG. 2B, in a state where liquid columns of recording liquid that has just been jetted from the heads 61Y, 61M, 61C, and 61BK are temporarily bridging (connecting) the heads 61Y, 61M, 61C, and 61BK and the intermediate transfer drum 37, the voltage applying unit 33 applies, to the recording liquid in the state of liquid columns, an electric current including current components caused by an electrode oxidation reaction or an electrode reduction reaction. Accordingly, a difference in electrical potential is generated between the intermediate transfer drum 37 and the respective heads 61Y, 61M, 61C, and 61BK. Thus, as described below, the voltage applying unit 33 promotes the flocculation of the recording liquid in the above state.

Furthermore, as shown in FIG. 1, the image forming apparatus 100 includes a cleaning unit 34 for cleaning the intermediate transfer drum 37 by removing recording liquid, etc., remaining on the intermediate transfer drum 37, after the recording liquid has been transferred onto a transfer sheet S from the intermediate transfer drum 37. Furthermore, the image forming apparatus 100 includes a carriage 50 as a head supporting body for integrally supporting the heads 61Y, 61M, 61C, and 61BK. Furthermore, the image forming apparatus 100 includes a control unit (not shown) including a CPU for controlling the overall operations of the image forming apparatus 100 and a memory.

The conveying unit 10 includes the following elements in addition to the intermediate transfer drum 37. The conveying unit 10 includes a transfer unit 64 for transferring an image formed by recording liquid carried on the intermediate transfer drum 37 onto a transfer sheet S, when the transfer sheet S passes through a transfer part 31 which is an area in the transfer unit 64 facing the intermediate transfer drum 37. Furthermore, the conveying unit 10 includes a guide plate 39 for guiding a transfer sheet S fed from the sheet feeding unit 20 to the transfer part 31 and for guiding a transfer sheet S that has passed through the transfer part 31 to the sheet discharge tray 25. Furthermore, the conveying unit 10 includes a motor (not shown) acting as a driving unit for rotating/driving the intermediate transfer drum 37 in the A1 direction.

As described above, the image forming apparatus 100 performs an indirect method of indirectly forming an image on the transfer sheet S with the use of the intermediate transfer drum 37.

The transfer unit 64 includes a transfer roller 38 that is rotated by the rotation of the intermediate transfer drum 37. The transfer roller 38 may have a built-in heater for fixing the image transferred onto the transfer sheet S onto the transfer sheet S. Furthermore, the conveying unit 10 may include a fixing roller acting as a fixing unit for fixing, onto a transfer sheet S, an image transferred onto the transfer sheet S from the intermediate transfer drum 37 by the transfer roller 38.

Figure 2A:
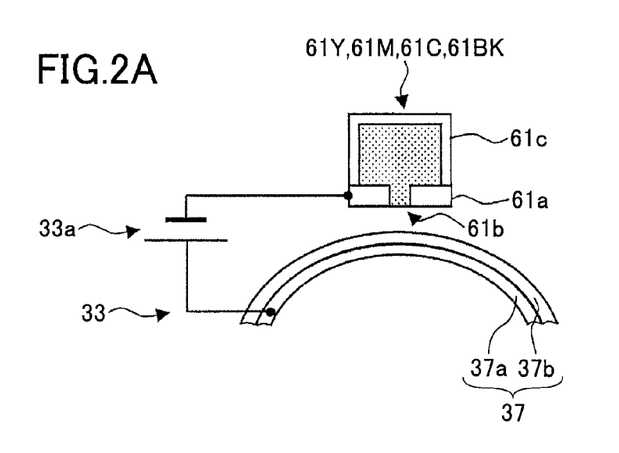
FIG. 2A illustrates the ink forming a meniscus in a nozzle.
Figure 2B:
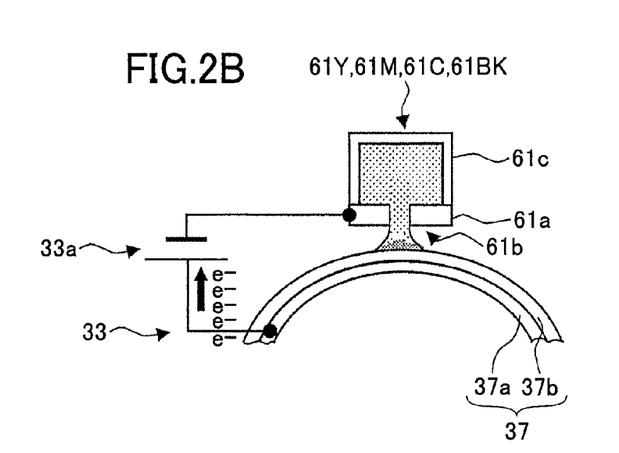
FIG. 2B illustrates a liquid column of jetted ink forming a bridge between the intermediate transfer body and the nozzle.
Figure 2C:
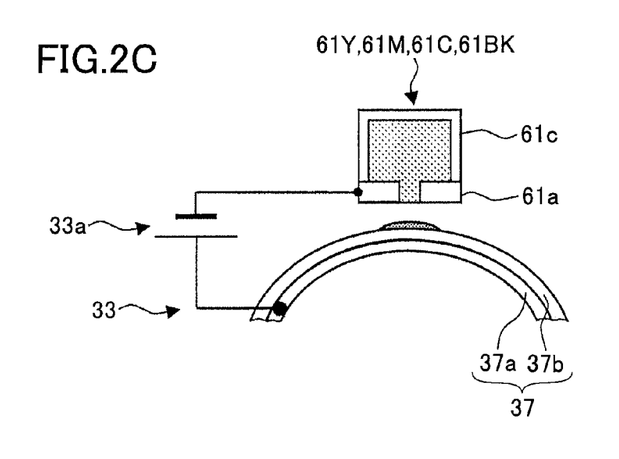
FIG. 2C illustrates an ink droplet separating from the nozzle and adhering on the intermediate transfer body as an image.

As shown in FIGS. 2A through 2C, the intermediate transfer drum 37 includes a supporting body 37a made of aluminum that is a conductive base substance, and a surface layer 37b made of silicone rubber formed on the supporting body 37a. The material of the supporting body 37a is not limited aluminum; the supporting body 37a may be made of a metal such as aluminum alloy, copper, and stainless steel, as long as it has mechanical strength. The material of the surface layer 37b is not limited to silicone rubber; the surface layer 37b may be made of, for example, urethane rubber, fluororubber, and nitrile-butadiene rubber, as long as it is a highly elastic material having low surface energy and a high propensity of following the transfer sheet S so that recording liquid can be easily peeled away.

In order to provide the intermediate transfer drum 37 with conductive properties, the surface layer 37b is a conductive layer formed with a conductive rubber material made by dispersing/mixing metal particles such as carbon, platinum, and gold in the rubber material as a conductive agent. However, the trade-off of increasing the amount of conductive particles is that the electric conductivity increases but parting properties decrease, and therefore the amount of conductive particles needs to be appropriately adjusted. As described below, in order to apply an electric current to the liquid columns of recording liquid temporarily bridging the heads 61Y, 61M, 61C, and 61BK and the intermediate transfer drum 37 to cause the difference in electrical potential, the volume resistivity of the conductive rubber is preferably less than $1 \times 10^3$ Ω·cm and preferably less than the volume resistivity of the recording liquid.

The thickness of the surface layer 37b is preferably approximately 0.1 mm through 1 mm, and more preferably 0.2 mm through 0.6 mm. However, the surface layer 37b is not an essential element; the intermediate transfer drum 37 may include only the supporting body 37a. Furthermore, the intermediate transfer drum 37 is not limited to a drum; the intermediate transfer drum 37 may be an endless belt or a sheet if possible.

As shown in FIG. 1, the sheet feeding unit 20 includes a sheet feeding tray 21 in which multiple transfer sheets S can be stacked. Furthermore, the sheet feeding unit 20 includes a sheet feeding roller 22 for feeding only the topmost transfer sheet S of the transfer sheets S stacked on the sheet feeding tray 21 to the conveying unit 10. Furthermore, the sheet feeding unit 20 includes a casing 23 supporting the sheet feeding tray 21 and the sheet feeding roller 22. Furthermore, the sheet feeding unit 20 includes a motor (not shown) acting as a driving unit for rotating/driving the sheet feeding roller 22 to feed the transfer sheet S at the timing when the heads 61Y, 61M, 61C, and 61BK jet the recording liquid.

A carriage 50 is detachably attached to the main body 99 together with the heads 61Y, 61M, 61C, and 61BK. Accordingly, the heads 61Y, 61M, 61C, and 61BK can be replaced with new ones or can be easily subjected to maintenance work when these are degraded. Furthermore, the heads 61Y, 61M, 61C, and 61BK are respectively detachably attached to the main body 99 (more precisely to the carriage 50), so that the heads 61Y, 61M, 61C, and 61BK can be replaced with new ones or can be easily subjected to maintenance work when these are degraded. Thus, the operation of replacing the heads 61 or performing maintenance work on the heads 61 can be facilitated.

The ink jetting devices 60Y, 60M, 60C, and 60BK have substantially the same configuration except for the difference in the color of recording liquid. The ink jetting devices 60Y, 60M, 60C, and 60BK respectively include plural heads 61Y, 61M, 61C, and 61BK that are aligned in the main scanning direction, thereby forming a fixed head type full-line configuration.

The ink jetting devices 60Y, 60M, 60C, and 60BK respectively include ink cartridges 81Y, 81M, 81C, and 81BK that are recording liquid cartridges acting as main tanks for accommodating recording liquids of the corresponding colors to be supplied to the heads 61Y, 61M, 61C, and 61BK. Furthermore, the ink jetting devices 60Y, 60M, 60C, and 60BK respectively include pumps (not shown) acting as supplying pumps for squeezing/feeding the recording liquids accommodated in the ink cartridges 81Y, 81M, 81C, and 81BK to the corresponding heads 61Y, 61M, 61C, and 61BK. Furthermore, the ink jetting devices 60Y, 60M, 60C, and 60BK respectively include distributor tanks (not shown) as distributors acting as ink supplying units that are recording liquid supplying units for distributing and supplying the recording ink supplied from the ink cartridges 81Y, 81M, 81C, and 81BK by the pumps to the corresponding heads 61Y, 61M, 61C, and 61BK.

Furthermore, the ink jetting devices 60Y, 60M, 60C, and 60BK respectively include ink amount detecting sensors (not shown) acting as ink amount detecting units that are recording liquid amount detecting units for detecting the amounts of recording liquid in the distributor tanks for detecting insufficiencies in the recording liquid. Furthermore, the ink jetting devices 60Y, 60M, 60C, and 60BK respectively include pipes (not shown) forming the recording liquid conveying paths between the ink cartridges 81Y, 81M, 81C, and 81BK and the distributor tanks, together with the pumps. Furthermore, the ink jetting devices 60Y, 60M, 60C, and 60BK respectively include pipes (not shown) forming the recording liquid conveying paths between the distributor tanks and the heads 61Y, 61M, 61C, and 61BK.

The ink cartridges 81Y, 81M, 81C, and 81BK are detachably attached to the main body 99 so that the ink cartridges 81Y, 81M, 81C, and 81BK can be replaced with new ones when there is little recording liquid remaining inside due to consumption or can be easily subjected to maintenance work.

Operations of the pumps are controlled by a control unit (not shown). Specifically, the pumps are driven on condition that the ink amount detecting sensor detects an insufficiency in the amount of recording liquid in the distributor tanks. The pumps are driven until such an insufficiency is no longer detected. The pumps are driven to supply the recording liquid in the ink cartridges 81Y, 81M, 81C, and 81BK to the distributor tanks. In this respect, the control unit functions as an ink supply control unit that is a recording liquid supply control unit. The control unit controls the driving operations in the image forming apparatus 100 which may not be particularly described below.

As shown in FIGS. 2A through 2C, the heads 61Y, 61M, 61C, and 61BK respectively include nozzle plates 61a with conductive properties, that are disposed on the recording liquid jetting side directed toward the bottom of FIGS. 2A through 2C. Furthermore, the heads 61Y, 61M, 61C, and 61BK respectively include nozzles 61b formed in the nozzle plates 61a. Furthermore, the heads 61Y, 61M, 61C, and 61BK respectively include ink chambers 61c filled with recording liquid supplied from the distributor tanks. Furthermore, the heads 61Y, 61M, 61C, and 61BK respectively include ink jetting units (not shown) for jetting the recording liquid inside the ink chambers 61c through the nozzles 61b.

The nozzle 61b, the ink chamber 61c, and the ink jetting unit form a combination, and the heads 61Y, 61M, 61C, and 61BK are respectively provided with multiple combinations, although FIGS. 2A through 2C only show one of the combinations.

The nozzle plate 61a is entirely conductive. The nozzle plate 61a includes an interface forming part corresponding to the surface on the ink chamber 61c side, which forms the interface between the recording liquid inside the ink chamber 61c and the nozzle plate 61a, and functions as a cathode. The surface of the nozzle plate 61a may have a water-repellent film. The water-repellent film may be formed by applying a fluorine series water-repellent agent or a silicon series water-repellent agent, or by coating the surface with a fluorine series polymer or a fluorine-metal compound eutectoid. The film is not particularly limited as long as it is water-repellent.

The nozzle plate 61a is not limited to being an entirely conductive plate. Only the surface of the nozzle plate 61a on the ink chamber 61c side may be conductive. Alternatively, the nozzle plate 61a may be formed with a conductive member disposed on the ink chamber 61c side and an insulating member provided on the intermediate transfer drum 37 side.

The conductive part of the nozzle plate 61a is provided as a cathode as described below. Therefore, the conductive part does not need to be formed with a material that is resistant to metal elution; the conductive part may be made of a material having high electric conductivity such as metal and carbon.

The ink jetting unit includes a piezoelectric element acting as an actuator for jetting the recording liquid from the nozzle 61b as liquid droplets onto the transfer sheet S. The ink jetting unit jets the recording liquid from the nozzle 61b in accordance with voltage pulses applied to the piezoelectric element.

The actuator of the ink jetting unit may be another type of movable actuator in which the shape of an element is changed by a piezo method, or an actuator for jetting recording liquid from the nozzle 61b by a heating method such as a thermal method.

The voltage applying unit 33 includes a power source 33a, an electric circuit (not shown) connecting the power source 33a to the supporting body 37a and the nozzle plate 61a, and a voltage application control unit for controlling the timing and duration of applying a voltage by the power source 33a. The above-described control unit also serves as the voltage application control unit. The control unit acting as the voltage application control unit also functions as a voltage changing unit for changing the voltage of the power source 33a.

The power source 33a has an anode connected to the supporting body 37a and a cathode connected to the nozzle plate 61a, by an electric circuit. Accordingly, the voltage applying unit 33 is provided with the intermediate transfer drum 37 as the anode, and the nozzle plate 61a as the cathode.

In the image forming apparatus 100 having the above configuration, when a predetermined signal for starting image formation is input, the intermediate transfer drum 37 rotates in the A1 direction while facing the heads 61Y, 61M, 61C, and 61BK. In this process, recording liquids of yellow, magenta, cyan, and black are jetted to the intermediate transfer drum 37 from the heads 61Y, 61M, 61C, and 61BK at different timings from the upstream side to the downstream side in the A1 direction, in such a manner that image areas of the respective colors of yellow, magenta, cyan, and black are superposed on the same position on the intermediate transfer drum 37. Accordingly, a full-color image is temporarily carried on the intermediate transfer drum 37.

At this time, the control unit acting as the voltage application control unit drives the voltage applying unit 33, so that voltage is applied between the supporting body 37a and the nozzle plate 61a from the power source 33a. In this state, the recording liquid is applied from the heads 61Y, 61M, 61C, and 61BK to the intermediate transfer drum 37. First, recording liquid forming a meniscus in the nozzle 61b moves toward the intermediate transfer drum 37 from each of the heads 61Y, 61M, 61C, and 61BK as shown in FIG. 2B. Accordingly, a bridge made by a liquid column of the recording liquid is temporarily formed between each of the ink chambers 61c and the intermediate transfer drum 37.

Next, as shown in FIG. 2C, as the bridge made by the liquid column of the recording liquid is broken and held on the intermediate transfer drum 37, an image is formed on the intermediate transfer drum 37 by the recording liquid.

Figure 3:
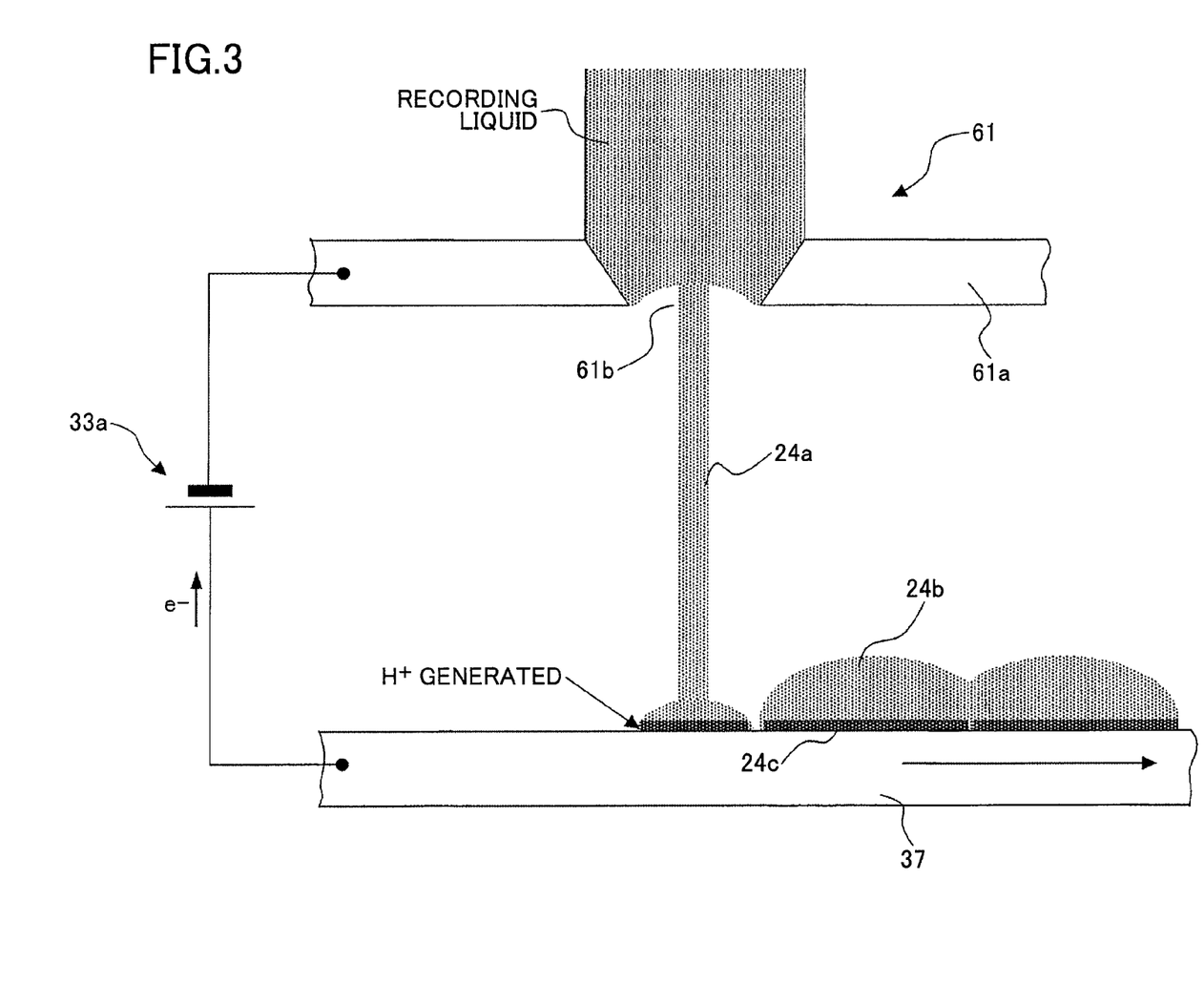
FIG. 3 illustrates a thickening mechanism on the intermediate transfer body.

As shown in FIG. 3 (a partial enlarged view of FIG. 2B), while a voltage is applied and a bridge is formed between the recording head 61 and the intermediate transfer drum 37 by a liquid column of the recording liquid for forming an image, electrolysis occurs in the water of the water-soluble recording liquid and an electric current is applied.

By applying a voltage such that the intermediate transfer drum 37 side becomes the anode and the recording head 61 side becomes the cathode, hydrogen ions are generated due to reactions according to the following formulas (1) and (2) at the interface between the intermediate transfer drum 37 and the recording head 61, and the pH locally decreases.

intermediate transfer body side:

$$2H_2O \rightarrow 4H^+ + O_2 + 4e^- \quad (1)$$

recording head side:

$$4H_2O + 4e^- \rightarrow 2H_2 + 4OH^- \quad (2)$$

The recording liquid used in the present embodiment includes water, a coloring agent, a wetting agent, a water-soluble metal complex including polyvalent metal ions, and an anionic polymer that indicates thickening properties by being cross-linked with the polyvalent metal ions. The recording liquid is pH adjusted in advance so that the polyvalent metal ions are substantially inactivated.

When hydrogen ions are generated on the intermediate transfer drum 37 side, the bond between the polyvalent metal ions and the water-soluble metal complex becomes weak, and the polyvalent metal ions become activated. Then, the anionic polymer becomes cross-linked with the polyvalent metal ions that have detached from the water-soluble metal complex. Accordingly, the recording liquid that has adhered on the intermediate transfer drum 37 becomes thickened (the viscosity of the recording liquid increases).

At this time, the coloring agent is not flocculated due to the polyvalent metal ions, and the color material is dispersed in the recording liquid.

That is to say, the recording liquid can be thickened while preventing the image density from decreasing due to flocculation of the coloring agent. Accordingly, high quality images can be formed, which are free from feathering, bleeding, or beading (where adjacent liquid droplets are assembled).

With the method of patent document 2, bleeding can be mitigated as the color material is flocculated; however, if color materials become fixed to each other, the image density is decreased. This problem can be prevented with the present invention according to the reasons described above.

The structure of the chelate agent (for example, nitrilotriacetic acid) that inactivates the polyvalent metal ions is as described in non-patent document 1, for example. When hydrogen ions are applied to the polyvalent metal ions in an inactivated state (in a state where the polyvalent metal ions do not react with any other component) and the pH decreases, the bond between the polyvalent metal ions and the chelate agent becomes weak and the polyvalent metal ions are detached from the complex state, and the polyvalent metal ions cross-link with the anionic polymer included in the recording liquid.

It is obvious that the anionic polymer is easily cross-linked with polyvalent metal ions from, for example, non-patent document 2 describing that alginate sodium (salt of anionic polymer) immediately becomes cross-linked (turns into a gel) when Ca ions are added.

Accordingly, in an embodiment of the present invention, bleeding, feathering, and beading are mitigated, so that the image quality is maintained on the intermediate transfer drum 37.

The recording liquid is transferred to a paper sheet after being thickened on the intermediate transfer drum 37, and therefore bleeding, feathering, and beading are also mitigated also on the paper sheet.

The amount of generated hydrogen ions can be changed by factors such as the electric conductivity of the recording liquid and the applied voltage, and therefore the degree of the thickening effect on the intermediate transfer drum 37 can be controlled.

As described above, in an embodiment of the present invention, the recording liquid itself is used as a source for generating pH change to activate the polyvalent metal ions. Accordingly, there is no need to separately provide a processing liquid (consumable) for changing the pH other than the recording liquid. Thus, the jetting control function can be simplified both in terms of the configuration and the control operation, thereby increasing reliability and reducing the running cost.

Furthermore, high quality images can be formed on plain paper without bleeding, etc., without the need of using special paper that has been pH-adjusted.

Furthermore, as the intermediate transfer method is performed, the nozzles of the recording heads 61 can be prevented from being clogged by paper particles, and therefore images can be formed highly reliably in this respect also.

A more detailed description is given of the configuration between the recording head 61 and the intermediate transfer drum 37 with reference to FIG. 3.

The distance between the nozzle plate 61a of the recording head 61 and the surface layer 37b of the intermediate transfer drum 37 is 100 μm, the nozzle diameter is 25 μm, a recording liquid dot 24b is approximately 50 μm, and a liquid column 24a is approximately 10 μm. After jetting the recording liquid from the nozzle, the liquid column 24a lands on the surface layer 37b of the intermediate transfer drum 37 to bridge the recording head 61 and the intermediate transfer drum 37. Accordingly, a Faraday current is generated by the electrolysis of water with a non-Faraday current, by which an electric double layer is formed at the electrode interface.

The reaction resistance of the electrolysis of water of several tens to several hundreds V is negligibly small, and therefore the solution resistance of the recording liquid becomes dominant. It takes several μs to several tens μs for the liquid column 24a to be divided near the nozzle such that the bridged state ends. The product obtained by multiplying this time by the Faraday current is the amount of electric charges that are applied. As the amount of the electric charges increases, more hydrogen ions are generated. Hydrogen ions are generated from the electrode interface of the intermediate transfer drum 37, and therefore many recording liquid flocculation parts 24c where the anionic polymer has been thickened exist on the surface of the intermediate transfer drum 37. Due to the existence of the recording liquid flocculation parts 24c, it is possible to mitigate the problem of beading where the number of dots increase or the positions of the dots are shifted due to surface tension.

However, the time during which a bridge is formed between the recording head 61 and the intermediate transfer drum 37 is extremely short (several μs to several tens μs). Therefore, with a typical recording liquid having an electric conductivity of approximately 10 mS/m through 200 mS/m, a sufficient amount of hydrogen ions for achieving the above-described thickening effect cannot be obtained. If the electric conductivity is too low, only a non-Faraday current for forming an electric double layer at the electrode interface is generated. Thus, by adding an electrolyte component to the recording liquid for increasing the electric conductivity of the recording liquid, it is possible to increase the amount of generated hydrogen ions, so that beading, etc., can be mitigated by the above-described effects.

By adding an electrolyte component to the recording liquid, the electric conductivity of the recording liquid can be increased so that a sufficient amount of hydrogen ions for achieving the above-described thickening effect of the anionic polymer can be obtained. Accordingly, the thickening effect and the flocculating effect of the recording liquid can be intensified, so that the image quality can be improved.

Examples of electrolyte components for increasing the electric conductivity (ion conductivity) are inorganic alkali metal salts such as sodium chloride, potassium chloride, lithium chloride, rubidium chloride, sodium bromide, sodium iodide, sodium sulfate, sodium sulfite, sodium acid sulfite, sodium thiosulfate, potassium sulfate, sodium nitrate, sodium nitrite, potassium nitrate, sodium phosphate, sodium carbonate, and sodium hydrogen carbonate; organic alkali metal salts such as sodium acetate, potassium acetate, sodium oxalate, sodium citrate, sodium hydrogen citrate, potassium citrate, and potassium acid citrate; and organic ammonium salts such as ammonium chloride, ammonium nitrate, ammonium sulfate, tetramethylammonium chloride, tetramethyl ammonium nitrate, and choline chloride.

As an electrolyte component, quaternary ammonium salt is preferably added. Quaternary ammonium ions are charge-dispersed by an alkyl group bound to the center element, and are stable because there are few mutual interactions with carboxyl ions of an anionic coloring agents and anionic resin. Furthermore, quaternary ammonium ions hardly form clusters with water, and thus do not take away the hydration water required for dispersing/dissolving the anionic coloring agent and anionic resin. According to these effects, quaternary ammonium salt can increase the electric conductivity without degrading the stability in dispersing/dissolving the anionic coloring agent and anionic resin. Compounds having low molecular weight have high electric conductivity (molar ionic conductivity) per unit molecular weight, and tetramethylammonium salt is particularly preferable among quaternary ammonium salts. Furthermore, as counter ions, there are chloride ions, nitrate ions, and sulfate ions. However, with chloride ions, an electrode reaction may occur at. the anode and chlorine may be generated. Therefore, inactivated nitrate ions and sulfate ions are preferable.

The coloring agent is not particularly limited, and conventionally known pigment or dye may be used; however, dye is particularly preferable in that the coloring agent is hardly flocculated by polyvalent metal ions.

Examples of dye used in the recording liquid used in an embodiment of the present invention are direct dye, oxidized dye, edible dye, basic dye, reactive dye, dispersed dye, vat dye, soluble vat dye, reactive disperse dye, and oil dye, that are typically known. Any of these may be used, but soluble dye is preferable in terms of the performance of the recording liquid.

Preferable examples of the dye include C.I. direct red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 243, 247, C.I. direct violet 7, 9, 47, 48, 51, 66, 90, 93, 94, 95, 98, 100, 101, C.I. direct yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, 163, C.I. direct blue 1, 10, 15, 22, 25, 55, 67, 68, 71, 76, 77, 78, 80, 84, 86, 87, 90, 98, 16, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 291, C.I. direct black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199, C.I. acid red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397, C.I. acid violet 5, 34, 43, 47, 48, 90, 103, 126, C.I. acid yellow 17, 19, 23, 25, 39, 40, 42, 44, 49, 50, 61, 64, 76, 110, 127, 135, 143, 151, 159, 169, 174, 190, 195, 196, 197, 199, 218, 219, 222, 227, C.I. acid blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 278, 279, 280, 288, 290, 326, C.I. acid black 7, 24, 29, 48, 52:1, 172, C.I. reactive red 3, 13, 17, 19, 21, 22, 23, 24, 29, 35, 37, 40, 41, 43, 45, 49, 55, C.I. reactive violet 1, 3, 4, 5, 6, 7, 8, 9, 16, 17, 22, 23, 24, 26, 27, 33, 34, C.I. reactive yellow 2, 13, 14, 15, 17, 18, 23, 24, 25, 26, 27, 29, 35, 37, 41, 42, C.I. reactive blue 2, 3, 5, 8, 10, 13, 14, 15, 17, 18, 19, 21, 25, 26, 27, 28, 29, 38, C.I. reactive black 4, 5, 8, 14, 21, 23, 26, 31, 32, 34, C.I. basic red 12, 13, 14, 15, 18, 22, 23, 24, 25, 27, 29, 35, 36, 38, 39, 45, 46, C.I. basic violet 1, 2, 3, 7, 10, 15, 16, 20, 21, 25, 27, 28, 35, 37, 39, 40, 48, C.I. basic yellow 1, 2, 4, 11, 13, 14, 15, 19, 21, 23, 24, 25, 29, 32, 36, 39, 40, C.I. basic blue 1, 3, 5, 7, 9, 22, 26, 41, 45, 46, 47, 54, 57, 60, 62, 65, 66, 69, 71, and C.I. basic black B.

The additive amount of dye is determined depending on the type of dye, the type of solvent component, and the properties required of an inkjet recording liquid. However, in general, the additive amount of dye is preferably within a range of 0.2 weight percent through 15 weight percent with respect to the entire weight of ink, more preferably within a range of 0.5 weight percent through 10 weight percent with respect to the entire weight of ink.

The recording liquid according to an embodiment of the present invention includes anionic polymer compounds as described above.

Examples of an anionic polymer compound to be added to the recording liquid are elements in the natural system including a vegetable polymer such as Arabic gum, traganth gum, guar gum, Karaya gum, Locust bean gum, Arabic galactane, pectin, and quince seed starch; a seaweed system polymer such as alginate, carrageenan, and vegetable gelatin; an animal system polymer such as gelatin, casein, albumin, and collagen; and microbe system polyer or shellac such as xanthene gum and dextran: elements in the half construction system including a cellulose system polymer such as methyl cellulose, ethyl cellulose, hydroxyethyl cellulose, hydroxypropyl cellulose, and carboxymethyl cellulose; a starch system polymer such as starch sodium glycolate and starch ester sodium phosphate; and a seaweed system polymer such as alginic acid and salt thereof and propylene glycol ester alginate: elements in the pure synthetic system including a vinyl system polymer such as polyvinyl alcohol, polyvinylpyrrolidone, and polyvinyl methyl ether; acrylic system resin such as nonbridging polyacrylamide, polyacrylic acid and alkali metal salt thereof, and water-soluble styrene-acrylate resin; and alkali metal salt such as water-soluble styrene-maleate resin, water-soluble vinylnaphthalene-acrylic resin, water-soluble vinylnaphthalene-maleate resin, polyvinylpyrrolidone, polyvinyl alcohol, and β naphthalenesulfonate formaldehyde condensation.

An anionic polymer compound including carboxylic acid as the anion group is particularly preferably used because it is easily cross-linked by polyvalent metal ions and has high thickening effects.

For the same reason, the anionic polymer is preferably a polysaccharide or a salt thereof or an alginic acid or a salt thereof.

Furthermore, in an inkjet printer using an intermediate transfer drum 37, the anionic polymer is effective in improving the transfer rate from the intermediate transfer drum 37 to paper in the transfer process.

Examples of metals in the polyvalent metal ions used in an embodiment of the present invention are $Mg^{2+}$, $Ca^{2+}$, $Ba^{2+}$, $Cu^{2+}$, $Co^{2+}$, $Co^{3+}$, $Mn^{2+}$, $Ce^{3+}$, $Ce^{4+}$, $Zn^{2+}$, $Ni^{2+}$, $Cr^{3+}$, $Eu^{3+}$, $Fe^{2+}$, $Fe^{3+}$, $Ga^{3+}$, $Ge^{4+}$, $In^{3+}$, $Pt^{2+}$, $Pt^{4+}$, $Au^{3+}$, $Pd^{2+}$, $La^{2+}$, $Nd^{3+}$, $Y^{3+}$, $Al^{3+}$, $Rh^{2+}$, $Rh^{3+}$, $Ru^{2+}$, $Ru^{3+}$, $Ru^{4+}$, $Sc^{3+}$, $Si^{4+}$, $Sm^{3+}$, $Ti^{4+}$, $U^{4+}$, and $Zr^{4+}$, although not limited thereto. In the present specification, for example, "$Mg^{2+}$" is indicated as "Mg2+" as a matter of convenience (the same applies to the other elements).

Furthermore, there are preferable types of metal salt according to the type of anionic polymer used.

For example, in the case of alginate sodium, polyvalent metal ions such as $Ca^{2+}$, $Ba^{2+}$, $Al^{3+}$, $Cu^{2+}$, and $Fe^{3+}$ are preferable.

Examples of compounds required for forming a metal complex which is an inactivated state of polyvalent metal ions, are nitrilotriacetic acid, ethylenediaminetetraacetic acid, diethylenetriaminepentaacetic acid, hydroxyethylethylenediaminetriacetic acid, hydroxyethyliminodiacetic acid, uracildiacetic acid, 1,10-phenanthroline, glycolic acid, hydroxyl ethylidenediphosphonic acid, lactic acid, malic acid, tartaric acid, citric acid, mandelic acid, salicylic acid, and polyphosphoric acid, or salt thereof.

Examples of compounds that are particularly appropriate for an embodiment of the present invention in terms of advantageously forming a complex with the polyvalent metal ions are nitrilotriacetic acid, ethylenediaminetetraacetic acid, diethylenetriaminepentaacetic acid, hydroxyethylethylenediaminetriacetic acid, and hydroxyethyliminodiacetic acid.

In the recording liquid, water is used as the primary liquid medium, but a water-soluble organic solvent described below is preferably used as a wetting agent in order to make the recording liquid have desirable physical properties, or to prevent the nozzles of the recording head 61 from being clogged by dried recording liquid.

Specific examples of a water-soluble organic solvent are polyhydric alcohols such as ethylene glycol, diethylene glycol, triethylene glycol, tetraethylene glycol, propylene glycol, 1,3-propanediol, 2-methyl[-1,3-propanediol, 1,4-butanediol, 1,5-pentanediol, 1,6-hexanediol, glycerine, 1,2,6-hexanetriol, 2-ethyl-1,3-hexanediol, 1,2,4-butanetriol, 1,2,3-butanetriol, and pentanetriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether, and propylene glycol monoethyl ether; polyhydric alcohol arylether such as ethylene glycol monophenyl ether and ethylene glycol monobenzyl ether; nitrogenous heterocyclic compounds such as N-methyl-2-pyrrolidone, N-hydroxyethyl-2-pyrolidone, 2-pyrolidone, 1,3-dimethylimidazolidinone, and ε-caprolactam; amides such as formamide, N-methylformamide, and N,N-dimethylformamide; amines such as monoethanolamine, diethanolamine, triethanolamine, monoethylamine, diethylamine, and triethylamine; sulfur-containing compounds such as dimethylsulfoxide, sulfolane, and thiodiethanol; and propylene carbonate, carbonic ethylene, and γ-butyrolactone.

Examples of other moisturizing ingredients are alcohol such as sorbitol, polysaccharide such as hyaluronic acid, a polymer such as polyethyleneglycol, and natural moisturizing ingredients such as urea, lactic acid, citrate, and an amino-acid system.

These solvents may be used alone or in combination, together with water. The amount of soluble organic solvents included in the recording liquid is not particularly limited, but is preferably within a range of 1 weight percent through 60 weight percent with respect to the entire amount of recording liquid, and more preferably within a range of 5 weight percent through 30 weight percent with respect to the entire amount of recording liquid.

In the recording liquid according to an embodiment of the present invention, for forming a stable complex including polyvalent metal ions, the pH value is preferably within a range of 7 through 10 in a case where the complex is made of nitrilotriacetic acid and Ca2+, and more preferably within a range of 7.5 through 9.5, although the pH value varies depending on the type of complex.

As an acid pH adjuster, boric acid, carbonic acid, hydrochloric acid, nitric acid, sulfuric acid, acetic acid, and ammonium chloride may be used. As an alkaline pH adjuster, hydroxide of alkaline metal elements such as lithium hydroxide, sodium hydroxide, and potassium hydroxide; carbonates of alkaline metal such as ammonium hydroxide, quaternary ammonium hydroxide, quaternary phosphonium hydroxide, lithium carbonate, sodium carbonate, and potassium carbonate; and amines such as diethanolamine and triethanolamine may be used.

Additionally, additives such as a pH buffer, a surface-active agent, a viscosity modifier, an antiseptic agent, an antioxidizing agent, and a corrosion control agent may be added according to need.

Furthermore, by including urea in the wetting agent components in the recording liquid, the viscosity of the recording liquid can be prevented from increasing even when polyhydric alcohol such as ethylene glycol and glycerin is used.

If the viscosity increases, the electric conductivity decreases even if the electrolyte weight is the same; however, by adding urea, the viscosity hardly increases, and therefore the electric conductivity is prevented from decreasing.

The intermediate transfer drum 37 is made of a supporting body made of aluminum and a surface layer made of conductive silicone rubber; however, the materials of the supporting body and the surface layer are not limited thereto.

The supporting body needs to have high conductivity and high mechanical strength, and is therefore preferably made of metal or an alloy thereof. The surface layer is to be made of a smooth, elastic material that is highly conductive and highly water-repellent. Electric conductivity is a function required for applying a voltage and an electric current to the intermediate transfer drum 37 and the recording head 61.

Water repellency is an index indicating the facilitation of transferring the water-soluble recording liquid from the surface layer of the intermediate transfer drum 37 to paper, and the higher the water repellency, the higher the transfer ratio. However, as the water repellency increases, it becomes difficult to retain the recording liquid, which leads to beading.

Elasticity is a function for the transfer process. Specifically, as the surface layer of the intermediate transfer drum 37 deforms along the fiber of the paper, the contact area between the paper and the intermediate transfer drum 37 increases, so that a high transfer ratio can be attained. In order to perform the transfer process with low pressure, a material having a certain level of softness is to be selected for forming the surface layer.

An example of a material that can satisfy the above functions is conductive rubber formed by mixing metal particles such as carbon black, carbon nano-tube, gold, and silver, in a rubber material such as fluoro silicone rubber, phenyl silicone rubber, fluorine-containing rubber, chloroprene rubber, nitrile rubber, nitrile butadiene rubber, and isoprene rubber. In order to increase the electric conductivity, conductive particles may be increased. However, if the density of conductive particles is high on the surface, the water repellency may be degraded.

The conductive properties are to be provided in at least the thickness direction of the supporting body and the surface layer. The surface direction (of the supporting body and the surface layer) may have insulating anisotropically conductive properties.

The conductive particles are to be sufficiently smaller than dots of approximately 20 μm through 50 μm forming the images. Conductive particles of less than or equal to 0.1 μm are sufficiently small.

The conductive particles may include silicon oil for increasing the water repellency, and the surface layer can be either a single layer structure or a multiple layer structure. The bulk properties and the surface properties are preferably as described below.

The volume resistivity of the conductive rubber is less than or equal to $10^4$ Ω·cm, preferably less than or equal to $10^2$ Ω·cm.

The water repellency corresponds to a retreat contact angle of water of greater than or equal to 60 degrees, preferably greater than or equal to 80 degrees. The hardness is less than or equal to 60, preferably less than or equal to 40 according to JIS-A (Japanese Industrial Standards).

The thickness of the surface layer is to be approximately 0.1 mm through 1 mm, and more preferably 0.2 mm through 0.6 mm.

The recording head 61 needs to be conductive, at least at the part contacting the liquid. The gap between the recording head 61 and the intermediate transfer drum 37 is 50 μm through 300 μm, more preferably 100 μm through 200 μm. If the gap is greater than or equal to 200 μm, depending on the type of recording liquid and jetting method, the liquid column 24a may be divided near the nozzle 61b due to surface tension of the recording liquid before the bridge is formed, and regular liquid droplets are formed.

Consequently, the bridge cannot be formed between the recording head 61 and the intermediate transfer drum 37. Meanwhile, if the gap is less than or equal to 50 μm, it may not be possible to maintain the gap.

The following descriptions are made by referring to an example of a method of recording an image directly onto a recording target material (recording medium) without using an intermediate transfer body.

With the present method, high quality images can be formed by making the pH of the recording paper lower than the pH of the recording liquid. The recording medium is preferably plain paper or a recording medium having an ink accepting layer; a recording medium having an ink accepting layer is particularly preferable.

When the recording liquid jetted from the recording head 61 adheres to an acid recording medium whose surface has a pH value of less than 7.0, the stable complex that exists in the recording liquid becomes unstable, and polyvalent metal ions are discharged from the water soluble complex of polyvalent metal ions.

The discharged metal ions increase the thickness of the recording liquid by cross-linking with the anionic polymer existing in the recording liquid, and therefore high-quality images can be formed.

By providing an application unit for applying, on the recording medium, a reaction liquid that changes the pH of the recording liquid, high quality images can be achieved.

In this method, the reaction liquid is an acid liquid having a pH of less than seven. When the reaction liquid contacts the recording liquid, the pH of the recording liquid decreases, and consequently the recording liquid becomes thicker as described above.

When the recording liquid and the reaction liquid are applied on the recording medium, it is preferable to first apply the reaction liquid and then apply the recording liquid on the surface of the recording medium.

Furthermore, the reaction liquid may be applied by jetting the reaction liquid from recording heads or by using a roller to apply the reaction liquid on the front surface of the recording medium, although not limited thereto.

Furthermore, the reaction liquid is preferably aqueous, and the pH adjuster may be the same as the recording liquid. Additionally, additives such as such as a pH buffer, a surface-active agent, a viscosity modifier, an antiseptic agent, an antioxidizing agent, and a corrosion control agent may be used according to need.

Detailed descriptions are given of examples of the present invention.

EXAMPLE 1

A recording liquid having the following configuration was prepared.
(Black Recording Liquid)
  reactive black 5: 4.0 weight %
  sodium polyoxyethylene alkyl ether sulfate: 2.0 mass %
  urea: 15.0 mass %
  glycerin: 5.0 mass %
  2-pyrolidone: 0.5 mass %
  1,2-octanediol: 0.5 mass %
  tetramethylammonium nitrate: 3 weight %
  nitrilotriacetic acid: 0.2 weight %
  calcium hydroxide: 0.06 weight %
  sodium hydroxide: 0.04 weight %
  alginate sodium (ULV-L3G, manufactured by KIMICA Corporation): 3.0 weight %
  distilled water: remaining amount As for yellow recording liquid, cyan recording liquid, and magenta recording liquid, reactive yellow 18, reactive blue 21, and reactive red 6 were respectively used as the coloring agents instead of reactive black 5 of the black recording liquid.

After preparing the above, pressure filtration was performed with a membrane filter having an average pore size of 0.8 μm.

Figure 4:
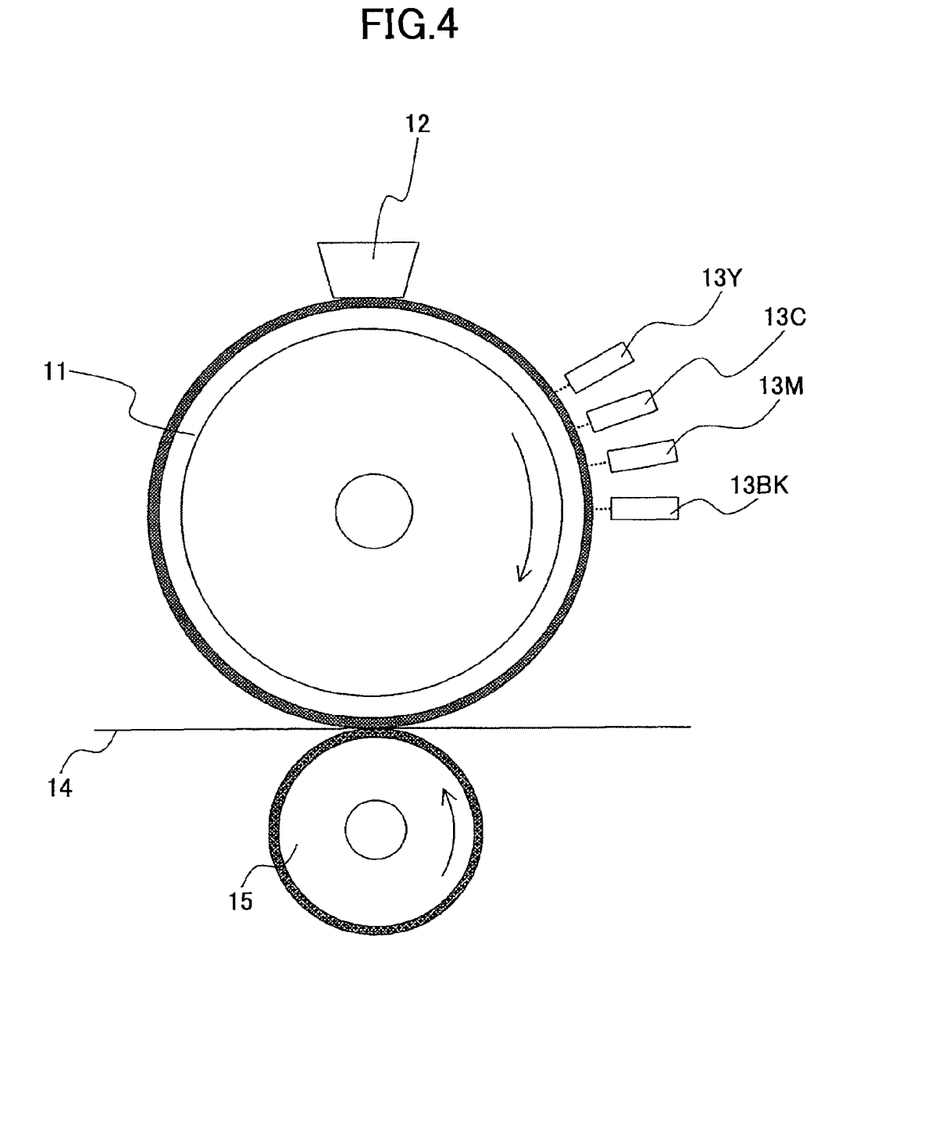
FIG. 4 illustrates a configuration used in example 1.

Next, an evaluation device as shown in FIG. 4, including a set of line type recording heads 13Y, 13C, 13M, and 13BK (or collectively denoted as "13"), an intermediate transfer roller 11, a pressure roller 15, and a cleaning unit 12, was prepared.

The supporting body of the intermediate transfer roller 11 is an aluminum raw pipe having a diameter of 20 mm and a length of 250 mm. The aluminum raw pipe has a conductive silicone rubber layer formed on its outer periphery. The conductive silicone rubber layer has a volume resistivity of 5 Ω·cm and a thickness of 0.2 mm. The intermediate transfer roller 11 is rotated in a clockwise direction at 200 mm/s.

The pressure roller 15 is pressed against the intermediate transfer roller 11 at a load of 20 kgf/cm², and is rotated in the counterclockwise direction in accordance with rotation of the intermediate transfer roller 11. The line type recording heads 13 (commercially available inkjet printer GX5000, manufactured by Ricoh Company, Ltd.) having nozzle plates made of metal, are spaced away from the surface of the intermediate transfer roller 11 with a gap of approximately 100 μm.

Furthermore, a power source (not shown) is connected for supplying sufficient electric currents between the nozzle plates of the line type recording heads 13 and the raw drum pipe of the intermediate transfer roller 11, for applying a voltage of 200 V. Furthermore, recording liquid dots of arbitrary patterns can be formed on the surface of the intermediate transfer roller 11 by a piezoelectric element driving unit (not shown).

A recording sheet (type 6200; pH 6.3) is passed between the intermediate transfer roller 11 and the pressure roller 15 so that recording liquid dots are transferred onto the surface of a plain paper sheet (recording sheet).

The line type recording heads 13 formed black recording liquid halftone dots at 300 dpi in the main scanning direction and 300 dpi in the sub scanning direction, in a strip-shaped continuous area that is approximately one inch wide in a direction orthogonal to the direction in which the surface of the intermediate transfer roller 11 moves (sub scanning direction). The piezoelectric element driving unit is adjusted such as each dot is 10 μl (pico liter).

Recording liquid halftone dots of two colors were formed at 300 dpi in the main scanning direction and 300 dpi in the sub scanning direction, in a strip-shaped continuous area that is approximately one inch wide, with various combinations of black, yellow, cyan, and magenta.

The recording liquid halftone dots were transferred onto recording sheets and the density and the extent of bleeding of the images on the sheets were evaluated.

REFERENCE EXAMPLE 1

Figure 5:
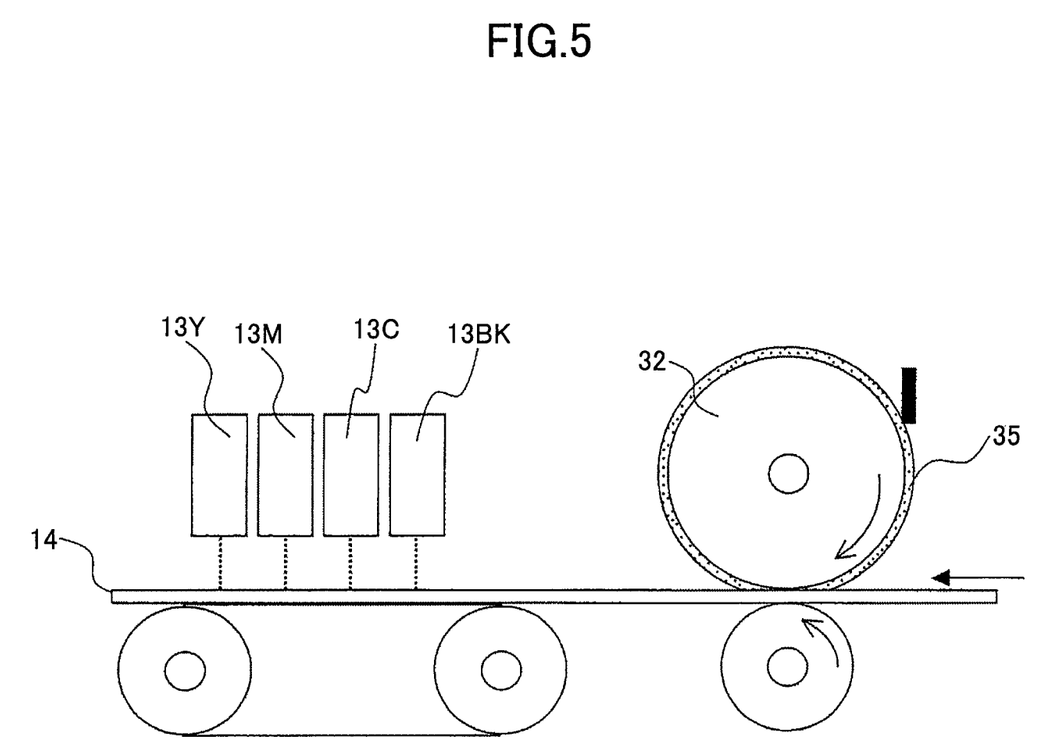
FIG. 5 illustrates a configuration used in comparative example 1.

The same recording liquid as that of example 1 was used.
Next, an evaluation device as shown in FIG. 5, including a set of line type recording heads 13Y, 13C, 13M, and 13BK and an application roller 32, was prepared.

The application roller 32 is used for applying a fixed amount of processing liquid 35 on a recording sheet 14.

The following processing liquid was prepared.
(Processing Liquid)
  sodium polyoxyethylene alkyl ether sulfate: 2.0 mass %
  1N hydrochloric acid water solution: 5 mass %
  distilled water: remaining amount The image patterns, recording sheets, and evaluation method were the same as those of example 1.

REFERENCE EXAMPLE 2

The same recording liquid as that of example 1 was used.
In the reference example 2, the processing liquid of reference example 1 was not applied.

The image patterns, recording sheets, and evaluation method were the same as those of example 1.

COMPARATIVE EXAMPLE 1

The same recording liquid as that of example 1 was used.
In comparative example 1, the voltage applied between the nozzle plates of the line type recording heads 13 and the raw drum pipe of the intermediate transfer roller 11 (as described in example 1) is 0 V.

COMPARATIVE EXAMPLE 2

A recording liquid having the following configuration was prepared.
(Black Recording Liquid)
  reactive black 5: 4.0 weight %
  sodium polyoxyethylene alkyl ether sulfate: 2.0 mass %
  urea: 15.0 mass %
  glycerin: 5.0 mass %

2-pyrolidone: 0.5 mass %
1,2-octanediol: 0.5 mass %
tetramethylammonium nitrate: 3 weight %
nitrilotriacetic acid: 0.2 weight %
sodium hydroxide: 0.02 weight %
alginate sodium (ULV-L3G, manufactured by KIMICA Corporation): 3.0 weight %
distilled water: remaining amount As for yellow recording liquid, cyan recording liquid, and magenta recording liquid, reactive yellow 18, reactive blue 21, and reactive red 6 were respectively used as the coloring agents instead of reactive black 5 of the black recording liquid.

After preparing the above, pressure filtration was performed with a membrane filter having an average pore size of 0.8 μm.

The evaluation device and evaluation method were the same as those of reference example 2.

The evaluation items of the image quality on a paper sheet were feathering, bleeding, and beading. These items were evaluated by a three-point scale of ○, Δ, and X. The evaluation results are shown in Table 1.

TABLE 1

|  | Feathering | Bleeding | Beading |
|---|---|---|---|
| Example 1 | ○ | ○ | ○ |
| Reference Example 1 | ○ | ○ | ○ |
| Reference Example 2 | Δ | Δ | Δ |
| Comparative Example 1 | X | X | X |
| Comparative Example 2 | X | Δ | Δ |

In example 1 and reference example 1, the ink applied on the paper was sufficiently thick, and therefore images were formed with less feathering, bleeding, and beading compared to comparative examples 1 and 2.

As for reference example 2, the ph of ink decreased as the ink adhered to the paper sheet, and therefore feathering, bleeding, and beading were mitigated, although not as effectively as example 1 and reference 1.

According to an aspect of the present invention, an image forming apparatus having stable liquid jetting properties is provided, with which high quality, high density images are formed with minimum feathering, bleeding, or beading, and without hampering high-speed printing. The recording liquid is provided with a means for changing the pH, and therefore, compared to a configuration that requires a separate adjustment liquid for changing the pH, the configuration can be simplified and the jetting control function can be simplified so that the reliability is increased, and the running cost can be reduced as result of using fewer consumables.

The present invention is not limited to the specific embodiments described herein, and variations and modifications may be made without departing from the scope of the present invention.

The present application is based on Japanese Priority Application No. 2010-110483 filed on May 12, 2010 with the Japan Patent Office, the entire contents of which are hereby incorporated by reference.

The invention claimed is:

1. An image forming apparatus comprising:
a recording head that jets a recording liquid for forming an image;
an intermediate transfer body that carries the image formed by the recording liquid, the intermediate transfer body facing the recording head;
a voltage applying unit that applies a voltage between the recording head and the intermediate transfer body; and
a transfer unit that transfers the image onto a recording target material, wherein
the recording liquid includes
water,
a coloring agent,
a wetting agent,
a water-soluble metal complex including polyvalent metal ions,
and an anionic polymer whose viscosity increases by being cross-linked with the polyvalent metal ions, wherein
the recording liquid is adjusted to have a pH value by which the polyvalent metal ions are inactivated, wherein
the recording liquid jetted from the recording head forms a bridge between the recording head and the intermediate transfer body, and
as the voltage applying unit applies the voltage, electrolysis occurs in the water in the recording liquid, and the pH value of the recording liquid is changed so that a viscosity of the recording liquid increases.

2. The image forming apparatus according to claim 1, wherein
the recording liquid includes an electrolyte component.

3. The image forming apparatus according to claim 2, wherein
the electrolyte component includes quaternary ammonium salt.

4. The image forming apparatus according to claim 1, wherein
the coloring agent is made of components that are not bound to or hardly bound to hydrogen ions and metal ions.

5. The image forming apparatus according to claim 4, wherein
the coloring agent is dye.

6. The image forming apparatus according to claim 1, wherein
the anionic polymer includes a carboxyl or a salt thereof.

7. The image forming apparatus according to claims 1 through 5 claim 1, wherein
the anionic polymer is polysaccharide or a salt thereof.

8. The image forming apparatus according to claim 1, wherein
the anionic polymer is an alginic acid or a salt thereof.

9. The image forming apparatus according to claim 1, wherein
the water-soluble metal complex is formed by at least one of nitrilotriacetic acid, ethylenediaminetetraacetic acid, diethylenetriaminepentaacetic acid, hydroxyethylethylenediaminetriacetic acid, and hydroxyethyliminodiacetic acid, or a salt thereof 10. The image forming apparatus according claim 1, wherein
the polyvalent metal ions are at least one of $Ca^{2+}$, $Ba^{2+}$, $Al^{3+}$, $Cu^{2+}$, and $Fe^{3\pm}$.

11. The image forming apparatus according to claim 1, wherein
the wetting agent includes urea.

12. The image forming apparatus according to claim 1, wherein
a plurality of the recording heads are provided for different colors.

13. A recording liquid that is jetted from a recording head to form an image, the recording liquid comprising:
water,
a coloring agent,
a wetting agent, a water-soluble metal complex including polyvalent metal ions, and an anionic polymer whose viscosity increases by being cross-linked with the polyvalent metal ions, wherein the recording liquid is adjusted to have a pH value by which the polyvalent metal ions are inactivated, and as a voltage is applied to the recording liquid, electrolysis occurs in the water in the recording liquid, and the pH value of the recording liquid is changed so that a viscosity of the recording liquid increases.

\* \* \* \* \*